(12) United States Patent
Lin

(10) Patent No.: US 12,418,241 B2
(45) Date of Patent: Sep. 16, 2025

(54) PRIMARY CONTROLLER APPLIED TO A PRIMARY SIDE OF A POWER CONVERTER AND OPERATION METHOD THEREOF

(71) Applicant: Leadtrend Technology Corp., Hsinchu County (TW)

(72) Inventor: Tzu-Chen Lin, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 280 days.

(21) Appl. No.: 18/137,423

(22) Filed: Apr. 20, 2023

(65) Prior Publication Data

US 2024/0195310 A1 Jun. 13, 2024

(30) Foreign Application Priority Data

Dec. 7, 2022 (TW) .................................. 111146987

(51) Int. Cl.
*H02M 3/335* (2006.01)
*H02M 1/00* (2006.01)
(52) U.S. Cl.
CPC ..... *H02M 3/33571* (2021.05); *H02M 1/0054* (2021.05)

(58) Field of Classification Search
CPC ............................................... H02M 3/335–42
See application file for complete search history.

(56) References Cited

U.S. PATENT DOCUMENTS

| | | | |
|---|---|---|---|
| 2018/0102709 A1* | 4/2018 | Hari | H02M 3/33523 |
| 2019/0006935 A1* | 1/2019 | Wang | H02M 3/33507 |
| 2019/0280601 A1* | 9/2019 | Song | H02M 3/33576 |

* cited by examiner

*Primary Examiner* — Peter M Novak
(74) *Attorney, Agent, or Firm* — Winston Hsu

(57) ABSTRACT

A primary controller applied to a primary side of a power converter includes a current peak upper limit adjustment circuit and a gate control signal generation circuit. The current peak upper limit adjustment circuit increases a current peak upper limit of the primary side of the power converter when a gate control signal is enabled at a second valley of a voltage, and reduces the current peak upper limit when the gate control signal is enabled at an Nth valley of the voltage, wherein N is a positive integer. The gate control signal generation circuit is coupled to the current peak upper limit adjustment circuit, wherein the gate control signal generation circuit enables the gate control signal, disables the gate control signal according to the current peak upper limit, and the gate control signal is used for turning on a power switch of the primary side of the power converter.

10 Claims, 3 Drawing Sheets

PRIMARY CONTROLLER APPLIED TO A PRIMARY SIDE OF A POWER CONVERTER AND OPERATION METHOD THEREOF

BACKGROUND OF THE INVENTION

1. Field of the Invention

The present invention relates to a primary controller applied for a primary side of a power converter and an operational method thereof, and particularly to a primary controller and an operational method thereof that can regulate a current peak upper limit according to a voltage corresponding to a drain voltage of a synchronous switch of a second side of the power converter so that conduction loss of the power converter is significantly reduced and an output voltage the power converter can be regulated under a condition of the power converter operating in a discontinuous-conduction mode (DCM) and having a constant ON time (COT) control.

2. Description of the Prior Art

In the prior art, when an output voltage of a power converter with a constant ON time (COT) control is less than a reference voltage, a pulse width modulation signal inputted into the power converter can be enabled on the constant ON time. If the power converter operates in a discontinuous-conduction mode (DCM), the constant ON time corresponds to a constant current peak upper limit. That is, the power converter operates in pulse frequency modulation. Meanwhile, the output voltage is regulated by a frequency of the pulse width modulation signal.

The pulse frequency modulation can minimize switching loss of the power converter when a load of the power converter is light. However, when the load of the power converter is heavy and an alternating voltage inputted into the power converter is low line, because duty utility of the pulse width modulation signal is lower and a root mean square current of the power converter is larger, conduction loss of the power converter becomes very serious. In addition, under a condition of the pulse frequency modulation, if the current peak upper limit is fixed to make the frequency of the pulse width modulation signal fixed, the output voltage cannot be regulated when the power converter operates in a boundary current mode (BCM).

Therefore, how to solve disadvantages of the output voltage of the power converter not capable of being regulated and the power converter having more serious conduction loss will be an important issue for a designer of the power converter.

SUMMARY OF THE INVENTION

An embodiment of the present invention provides a primary controller applied for a primary side of a power converter. The primary controller includes a current peak upper limit adjustment circuit and a gate control signal generation circuit. The current peak upper limit adjustment circuit is used for increasing a current peak upper limit of the primary side of the power converter when a gate control signal is enabled at a second valley of a voltage, and reducing the current peak upper limit when the gate control signal is enabled at an $N^{th}$ valley of the voltage, wherein N is a positive integer. The gate control signal generation circuit is coupled to the current peak upper limit adjustment circuit, wherein the gate control signal generation circuit enables the gate control signal, disables the gate control signal according to the current peak upper limit, and the gate control signal is used for turning on a power switch of the primary side of the power converter.

Another embodiment of the present invention provides an operational method of a primary controller applied to a primary side of a power converter, wherein the primary controller includes a current peak upper limit adjustment circuit and a gate control signal generation circuit. The operational method includes the current peak upper limit adjustment circuit increasing a current peak upper limit of a primary side of the power converter when a gate control signal is enabled at a second valley of a voltage, and reducing the current peak upper limit when the gate control signal is enabled at an $N^{th}$ valley of the voltage, wherein N is a positive integer; and the gate control signal generation circuit enabling the gate control signal, and disabling the gate control signal according to the current peak upper limit, wherein the gate control signal is used for turning on a power switch of the primary side of the power converter.

The present invention provides a primary controller applied for a primary side of a power converter and an operational method thereof. The primary controller and the operational method can receive a voltage corresponding to a drain voltage of a synchronous switch of a second side of the power converter through a primary side auxiliary winding and a second side winding of the power converter and regulate a current peak upper limit of a primary side of the power converter accordingly under a condition that the power converter cannot detect an output voltage of the second side of the power converter to regulate the current peak upper limit and operates in a discontinuous-conduction mode. Therefore, compared to the prior art, the present invention has advantages as follows: first, because the primary controller can regulate the current peak upper limit to make the power converter operate approximately in the boundary current mode, duty utility of a gate control signal generated by the primary controller is higher, resulting in conduction loss of the power converter being significantly reduced; second, because the primary controller can regulate the current peak upper limit, the output voltage can be regulated These and other objectives of the present invention will no doubt become obvious to those of ordinary skill in the art after reading the following detailed description of the preferred embodiment that is illustrated in the various figures and drawings.

DETAILED DESCRIPTION

Figure 1:
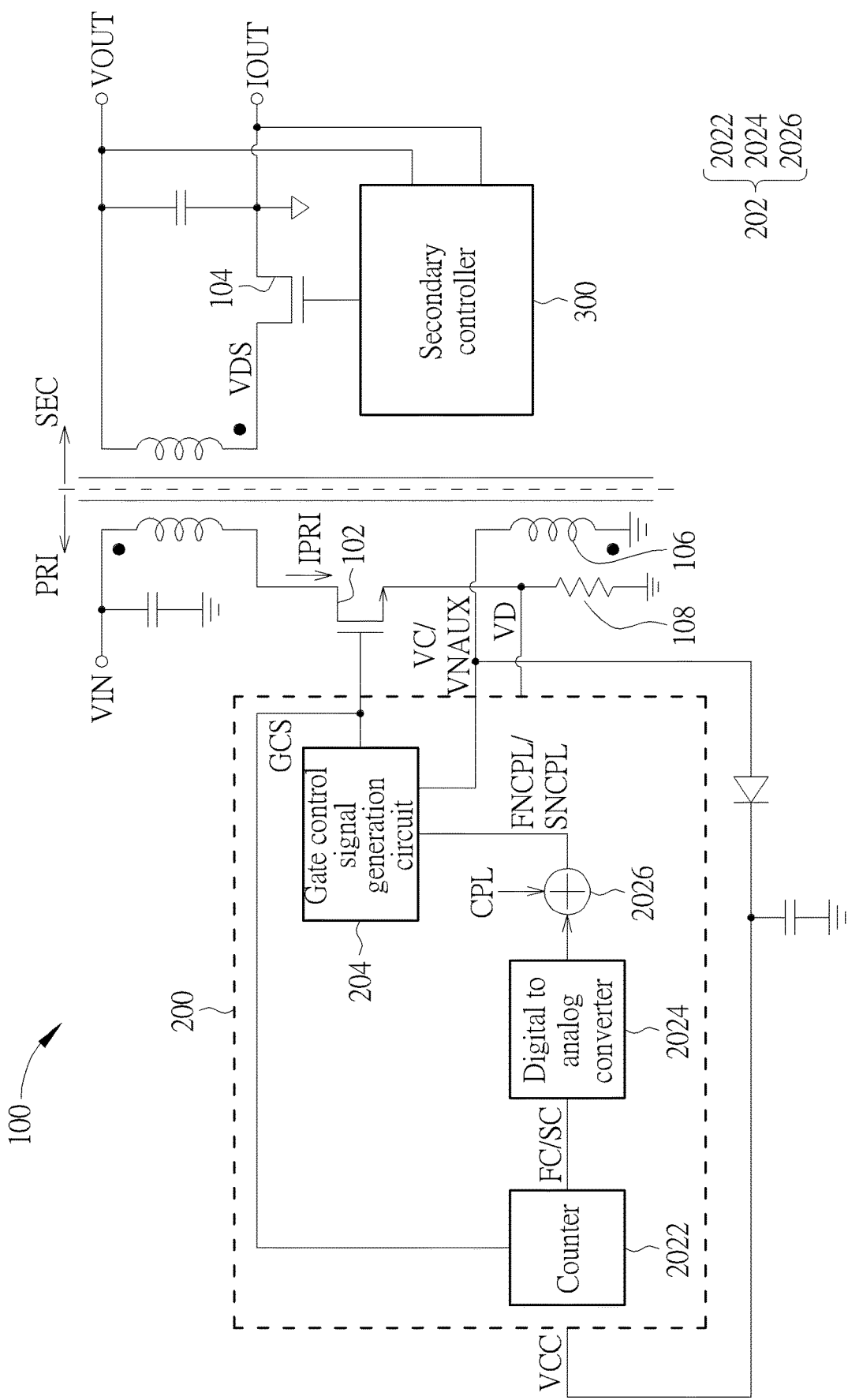
FIG. 1 is a diagram illustrating a primary controller applied to a primary side of a power converter according to a first embodiment of the present invention.

Please refer to FIG. 1. FIG. 1 is a diagram illustrating a primary controller 200 applied to a primary side PRI of a power converter 100 according to a first embodiment of the present invention, wherein as shown FIG. 1, the primary controller 200 at least includes a current peak upper limit adjustment circuit 202 and a gate control signal generation circuit 204, and the current peak upper limit adjustment circuit 202 includes a counter 2022, a digital to analog converter (DAC) 2024, and an adder 2026. The gate control signal generation circuit 204 is coupled to the current peak upper limit adjustment circuit 202, the digital to analog converter 2024 is coupled to the counter 2022, and the adder 2026 is coupled to the digital to analog converter 2024. In addition, the power converter 100 is a flyback power converter, and the power converter 100 operates in a discontinuous-conduction mode (DCM). In addition, the primary controller 200 is applied for a condition of the primary side PRI of the power converter 100 having a constant ON time (COT) control, and an output voltage VOUT of a secondary side SEC of the power converter 100 is regulated by a switching frequency of a gate control signal GCS which is used for turning on a power switch 102 of the primary side PRI of the power converter 100. In addition, for the sake of simplicity, the primary side PRI of the power converter 100 and the secondary side SEC of the power converter 100 only show elements corresponding to the present invention. In addition, as shown in FIG. 1, operational principles of how a secondary controller 300 applied to the secondary side SEC of the power converter 100 controls a synchronous switch 104 according to the output voltage VOUT/an output current IOUT of the secondary side SEC of the power converter 100 can be referred to Taiwan patent application No. I681615, so further description thereof is omitted for simplicity. In addition, an input voltage VIN of the primary side PRI of the power converter 100 is generated by rectifying an alternating voltage through a bridge rectifier (not sown in FIG. 1).

Figure 2:
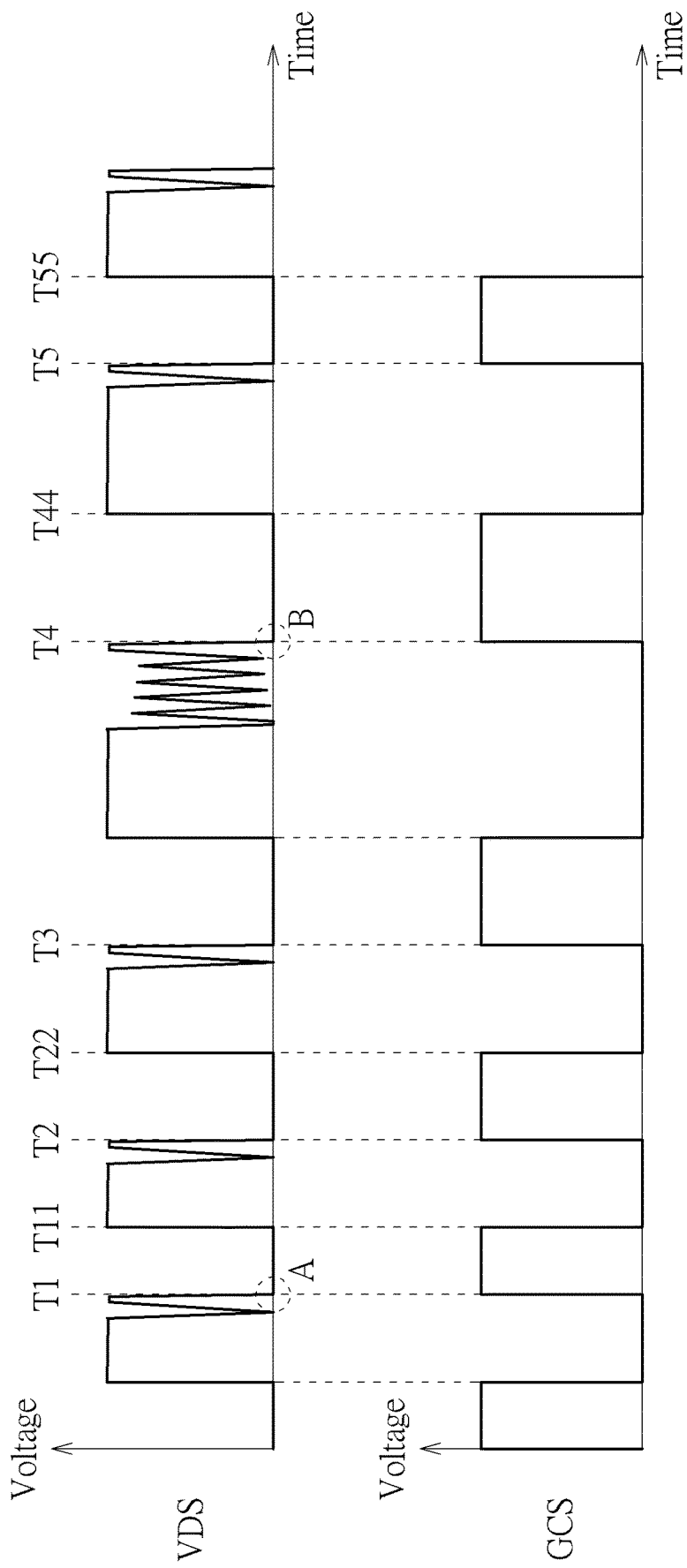
FIG. 2 is a diagram illustrating waveforms of a drain voltage of the synchronous switch of the secondary side of the power converter and the gate control signal.

After the primary side PRI of the power converter 100 is turned off (that is, after the gate control signal GCS for turning on the power switch 102 of the primary side PRI of the power converter 100 is disabled), waveforms of a drain voltage VDS of the synchronous switch 104 of the secondary side SEC of the power converter 100 and the gate control signal GCS can be referred to FIG. 2, wherein the drain voltage VDS can be coupled to a primary side auxiliary winding 106 of the power converter 100 to make the primary side auxiliary winding 106 generate a voltage VC, a waveform of the voltage VC is similar to the waveform of the drain voltage VDS, and the gate control signal GCS is a pulse width modulation signal. Therefore, when the output voltage VOUT of the secondary side SEC of the power converter 100 is less than a reference voltage VREF, because the power converter 100 operates in the discontinuous-conduction mode, the gate control signal generation circuit 204 enables the gate control signal GCS to turn on the power switch 102 at most at a time T1 corresponding to a second valley (a dashed-line circle A shown in FIG. 2) of the voltage VC, wherein the gate control signal generation circuit 204 enabling the gate control signal GCS to turn on the power switch 102 at the time T1 corresponding to the second valley (the dashed-line circle A shown in FIG. 2) of the voltage VC can make the power converter 100 operate approximately in a boundary current mode (BCM). In addition, because the waveform of the voltage VC is similar to the waveform of the drain voltage VDS, the second valley of the voltage VC corresponds to a second valley of the drain voltage VDS. Meanwhile, the counter 2022 coupled to the gate control signal generation circuit 204 increases a current count stored in the counter 2022 to a first count FC (e.g. the counter 2022 adds one to the current count (e.g. 0) to generate the first count FC (i.e. 1)). Then, the digital to analog converter 2024 can generate one unit current variation (wherein the unit current variation corresponds to a difference 1 between the first count FC (1) and the current count (0)) according to the first count FC (1) and the current count (0). Finally, the adder 2026 makes a current peak upper limit CPL (corresponding to the current count (i.e. 0)) be increased the unit current variation to become a first new current peak upper limit FNCPL (corresponding to the first count FC (i.e. 1)) according to the unit current variation. After the gate control signal generation circuit 204 receives the first new current peak upper limit FNCPL, the gate control signal generation circuit 204 can adjust a voltage upper limit. Then, the gate control signal generation circuit 204 will disable the gate control signal GCS in a next period of the power converter 100 according to the voltage upper limit and a detection voltage VD, wherein because the first new current peak upper limit FNCPL is greater than the current peak upper limit CPL, the voltage upper limit is also increased, resulting in an ON time of the gate control signal GCS being also increased (i.e. as shown in FIG. 2, an ON time T2-T22 (corresponding to the first count FC (i.e. 1)) corresponding to the next period of the gate control signal GCS is greater than an ON time T1-T11 (corresponding to the current count (i.e. 0)) corresponding to a current period of the gate control signal GCS). Thus, the output voltage VOUT is also increased accordingly. In addition, as shown in FIG. 1, the detection voltage VD is determined by a primary side current IPRI of the primary side PRI of the power converter 100 and a resistor 108. In addition, as shown in FIG. 2, at the time T2 and the time T3, operational principles of the gate control signal generation circuit 204 enabling the gate control signal GCS corresponding to the second valley of the voltage VC can be referred to operational principles of the gate control signal generation circuit 204 enabling the gate control signal GCS corresponding to the second valley of the voltage VC at the time T1, so further description thereof is omitted for simplicity. In addition, after the time T3, the current count stored in the counter 2022 is 3. In addition, one of ordinary skilled in the art should know an auxiliary voltage VNAUX of the primary side auxiliary winding 106 can be used for generating a supply voltage VCC of the primary controller 200.

When the output voltage VOUT of the secondary side SEC of the power converter 100 is not less than the reference voltage VREF, the gate control signal generation circuit 204 enables the gate control signal GCS to turn on the power switch 102 at a time T4 which corresponds to an $N^{th}$ valley (e.g. the fourth valley at a dashed-line circle B in FIG. 2) of the voltage VC, wherein N is a positive integer. In addition, because the waveform of the voltage VC is similar to the waveform of the drain voltage VDS, the fourth valley of the voltage VC corresponds to a fourth valley of the drain voltage VDS. Meanwhile, the current count stored in the counter 2022 will become a second count SC by the counter 2022 subtracting N−M from the current count stored in the counter 2022, wherein M is less than N and M is a positive integer greater than 2 (e.g. the current count (i.e. 3) will become the second count SC (i.e. 1) by the counter 2022 subtracting (4−2) from the current count (i.e. 3), and N−M is in proportion to a dead time of the power converter 100. Then, the digital to analog converter 2024 can generate two unit current variations (wherein the two unit current variations correspond to a difference 2 between the second count SC (1) and the current count (3)) according to the second count SC (1) and the current count (3). Finally, the adder 2026 makes the current peak upper limit CPL be reduced the two unit current variations to become a second new current peak upper limit SNCPL (corresponding to the second count SC (i.e. 1)) according to the two unit current variations. After the gate control signal generation circuit 204 receives the second new current peak upper limit SNCPL, the gate control signal generation circuit 204 can adjust the voltage upper limit. Then, the gate control signal generation circuit 204 will disable the gate control signal GCS in a next period of the power converter 100 according to the voltage upper limit and the detection voltage VD, wherein because the second new current peak upper limit SNCPL is less than the current peak upper limit CPL, the voltage upper limit is also reduced, resulting in the ON time of the gate control signal GCS being also reduced (i.e. as shown in FIG. 2, an ON time T5-T55 (corresponding to the second count SC (i.e. 1)) corresponding to the next period of the gate control signal GCS is less than an ON time T4-T44 (corresponding to the current count (i.e. 3))) corresponding to the current period of the gate control signal GCS. Thus, the output voltage VOUT is also reduced accordingly. In addition, because an ON time T5-T55 of the gate control signal GCS corresponds to the second count SC (i.e. 1), the ON time of the gate control signal GCS will be equal to the ON time T2-T22 (corresponding to the first count FC (i.e. 1) of the gate control signal GCS).

In addition, in another embodiment of the present invention, the power converter 100 can be an active-clamp flyback (ACF) power converter) or an asymmetric half-bridge (AHB) flyback power converter.

Figure 3:
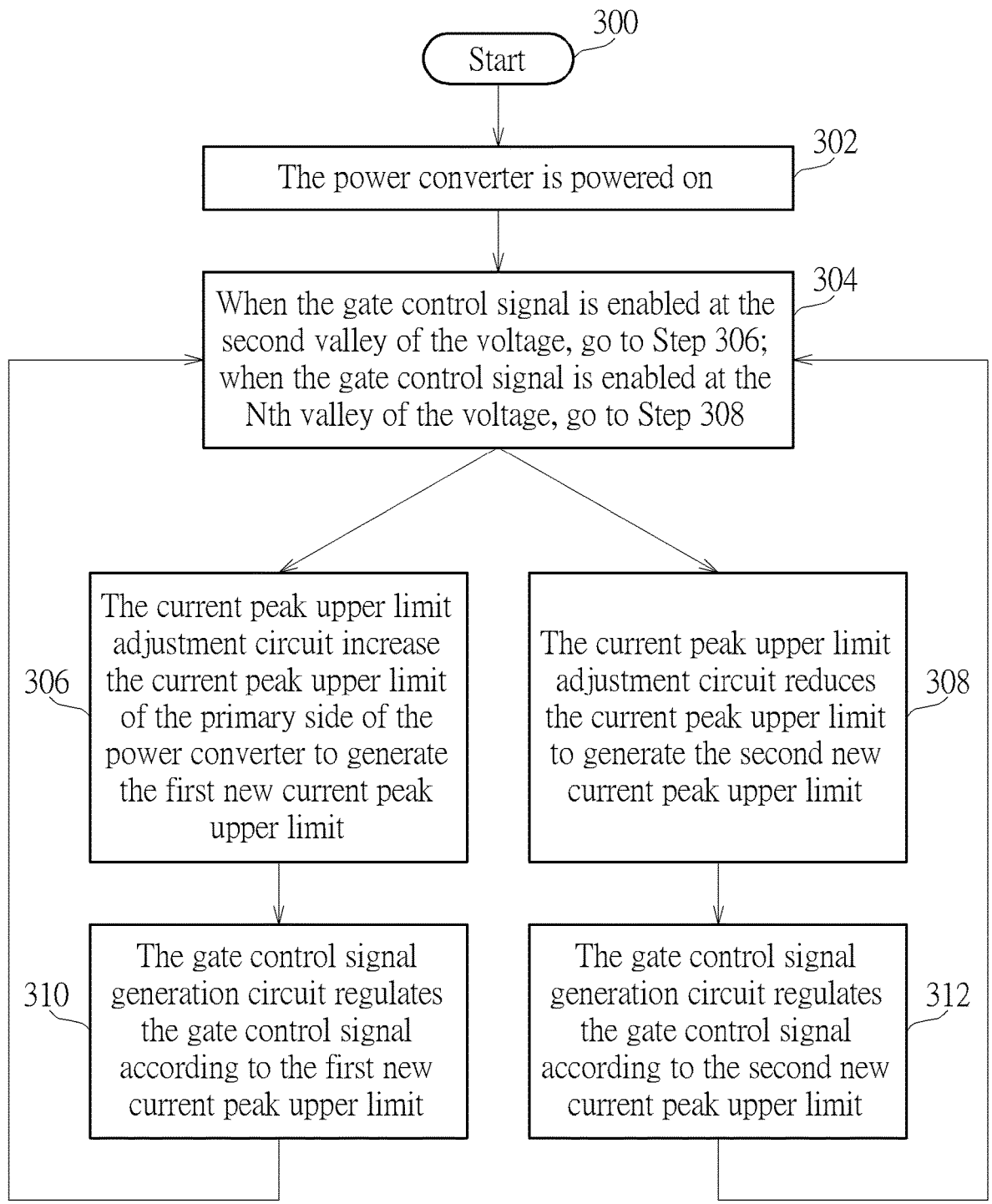
FIG. 3 is a flowchart illustrating an operational method of the primary controller applied to the primary side of the power converter according to a second embodiment of the present invention.

In addition, please refer to FIG. 1, FIG. 2, FIG. 3. FIG. 3 is a flowchart illustrating an operational method of the primary controller 200 applied to the primary side PRI of the power converter 100 according to a second embodiment of the present invention. Detailed steps of the operational method shown in FIG. 3 are as follows:

Step 300: Start.
Step 302: The power converter 100 is powered on.
Step 304: When the gate control signal GCS is enabled at the second valley of the voltage VC, go to Step 306; when the gate control signal GCS is enabled at the $N^{th}$ valley of the voltage VC, go to Step 308.
Step 306: The current peak upper limit adjustment circuit 202 increase the current peak upper limit CPL of the primary side PRI of the power converter 100 to generate the first new current peak upper limit FNCPL, go to Step 310.
Step 308: The current peak upper limit adjustment circuit 202 reduces the current peak upper limit CPL to generate the second new current peak upper limit SNCPL, go to Step 312.
Step 310: The gate control signal generation circuit 204 regulates the gate control signal GCS according to the first new current peak upper limit FNCPL, go to Step 304.
Step 312: The gate control signal generation circuit 204 regulates the gate control signal GCS according to the second new current peak upper limit SNCPL, go to Step 304.

In Step 304, when the output voltage VOUT of the secondary side SEC of the power converter 100 is less than the reference voltage VREF, because the power converter 100 operates in the discontinuous-conduction mode, the gate control signal generation circuit 204 enables the gate control signal GCS to turn on the power switch 102 at most at the time T1 corresponding to the second valley (the dashed-line circle A shown in FIG. 2) of the voltage VC, wherein the gate control signal generation circuit 204 enabling the gate control signal GCS to turn on the power switch 102 at the time T1 corresponding to the second valley (the dashed-line circle A shown in FIG. 2) of the voltage VC can make the power converter 100 operate approximately in a boundary current mode (BCM).

In Step 306, meanwhile, the counter 2022 increases the current count stored in the counter 2022 to the first count FC (e.g. the counter 2022 adds one to the current count (e.g. 0) to generate the first count FC (i.e. 1)). Then, the digital to analog converter 2024 can generate one unit current variation (wherein the unit current variation corresponds to a difference 1 between the first count FC (1) and the current count (0)) according to the first count FC (1) and the current count (0). Finally, the adder 2026 makes the current peak upper limit CPL be increased the unit current variation to become the first new current peak upper limit FNCPL according to the unit current variation.

In Step 310, after the gate control signal generation circuit 204 receives the first new current peak upper limit FNCPL, the gate control signal generation circuit 204 can adjust the voltage upper limit. Then, the gate control signal generation circuit 204 will disable the gate control signal GCS in a next period of the power converter 100 according to the voltage upper limit and the detection voltage VD, wherein because the first new current peak upper limit FNCPL is greater than the current peak upper limit CPL, the voltage upper limit is also increased, resulting in an ON time of the gate control signal GCS being also increased. Thus, the output voltage VOUT is also increased accordingly.

In addition, in Step 304, when the output voltage VOUT of the secondary side SEC of the power converter 100 is not less than the reference voltage VREF, the gate control signal generation circuit 204 enables the gate control signal GCS to turn on the power switch 102 at the time T4 which corresponds to the $N^{th}$ valley (e.g. the fourth valley at the dashed-line circle B in FIG. 2) of the voltage VC, wherein N is a positive integer.

In Step 308, meanwhile, the current count stored in the counter 2022 will become the second count SC by the counter 2022 subtracting N−M from the current count stored in the counter 2022, wherein M less than N and M is a positive integer not less than 2 (e.g. the counter 2022 (i.e. 3) will become the second count SC (i.e. 1) by the counter 2022 subtracting (4−2) from the current count (i.e. 3)). Then, the digital to analog converter 2024 can generate the two unit current variations according to the second count SC (1) and the current count (3). Finally, the adder 2026 makes the current peak upper limit CPL be reduced the two unit current variations to become the second new current peak upper limit SNCPL according to the two unit current variations.

In Step 312, after the gate control signal generation circuit 204 receives the second new current peak upper limit SNCPL, the gate control signal generation circuit 204 can adjust the voltage upper limit. Then, the gate control signal generation circuit 204 will disable the gate control signal GCS in a next period of the power converter 100 according to the voltage upper limit and the detection voltage VD, wherein because the second new current peak upper limit SNCPL is less than the current peak upper limit CPL, the voltage upper limit is also reduced, resulting in the ON time of the gate control signal GCS being also reduced. Thus, the output voltage VOUT is also reduced accordingly.

To sum up, the primary controller and the operational method thereof can receive the voltage corresponding to the drain voltage through the primary side auxiliary winding and a second side winding of the power converter and regulate the current peak upper limit accordingly under a condition that the power converter cannot detect the output voltage to regulate the current peak upper limit and operates in the discontinuous-conduction mode. Therefore, compared to the prior art, the present invention has advantages as follows: first, because the primary controller can regulate the current peak upper limit to make the power converter operate approximately in the boundary current mode, duty utility of the gate control signal is higher, resulting in the conduction loss of the power converter being significantly reduced; second, because the primary controller can regulate the current peak upper limit, the output voltage can be regulated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A primary controller applied for a primary side of a power converter, comprising:
   a current peak upper limit adjustment circuit for increasing one unit current variation to a current peak upper limit of the primary side of the power converter when a gate control signal is enabled at a second valley of a voltage, and subtracting N–M unit current variations from the current peak upper limit when the gate control signal is enabled at an $N^{th}$ valley of the voltage, where N is a positive integer, M is less than N, and M is a positive integer greater than 2; and
   a gate control signal generation circuit coupled to the current peak upper limit adjustment circuit, wherein the gate control signal generation circuit enables the gate control signal, disables the gate control signal according to the current peak upper limit, and the gate control signal is used for turning on a power switch of the primary side of the power converter.

2. The primary controller of claim 1, wherein the current peak upper limit adjustment circuit comprises:
   a counter for increasing a current count stored in the counter to a first count when the gate control signal is enabled at the second valley of the voltage, and reducing the current count to a second count when the gate control signal is enabled at the Nth valley of the voltage;
   a digital to analog converter (DAC) coupled to the counter, wherein the digital to analog converter generates the unit current variation according to the first count, and generates the N–M unit current variations according to the second count; and
   an adder coupled to the digital to analog converter, wherein the digital to analog converter increases the current peak upper limit and reduces the current peak upper limit according to the unit current variation and the N–M unit current variations, respectively.

3. The primary controller of claim 1, wherein the power converter is a flyback power converter.

4. The primary controller of claim 1, wherein the power converter is an active-clamp flyback (ACF) power converter.

5. The primary controller of claim 1, wherein the power converter is an asymmetric half-bridge (AHB) flyback power converter.

6. The primary controller of claim 1, wherein the voltage relates to a drain voltage of a synchronous switch of a second side of the power converter.

7. The primary controller of claim 1, wherein the power converter operates in a discontinuous-conduction mode (DCM).

8. An operational method of a primary controller applied to a primary side of a power converter, wherein the primary controller comprises a current peak upper limit adjustment circuit and a gate control signal generation circuit, the operational method comprising:
   the current peak upper limit adjustment circuit increasing one unit current variation to a current peak upper limit of a primary side of the power converter when a gate control signal is enabled at a second valley of a voltage, and subtracting N–M unit current variations from the current peak upper limit when the gate control signal is enabled at an Nth valley of the voltage, wherein N is a positive integer, M is less than N, and M is a positive integer greater than 2; and
   the gate control signal generation circuit enabling the gate control signal, and disabling the gate control signal according to the current peak upper limit, wherein the gate control signal is used for turning on a power switch of the primary side of the power converter.

9. The operational method of claim 8, wherein the voltage relates to a drain voltage of a synchronous switch of a second side of the power converter.

10. The operational method of claim 8, wherein the power converter operates in a discontinuous-conduction mode.

* * * * *